Nov. 30, 1965     J. H. LEMELSON     3,220,871
PARTIALLY METAL COATED TRANSPARENT TEXTILE ELEMENT
Filed June 11, 1953
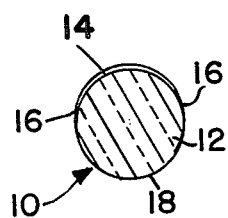
INVENTOR.
BY Jerome H. Lemelson

# United States Patent Office 3,220,871
Patented Nov. 30, 1965

3,220,871
PARTIALLY METAL COATED TRANSPARENT
TEXTILE ELEMENT
Jerome H. Lemelson, 289 High St., Perth Amboy, N.J.
Filed June 11, 1953, Ser. No. 360,954
1 Claim. (Cl. 117—37)

This invention relates to display devices and particularly devices which reflect and refract light rays.

An important object of this invention is to generally improve and present new reflecting display devices.

Another object is to present reflecting display devices having reflective surfaces of the type known as reflex reflectors.

Yet another object of this invention is to present new reflective surfaces which appear to flicker and flash on and off to an observer moving with a source of light striking the reflective surface.

Another object of this invention is to present new dynamic display devices which appear to flicker and flash on or off by virtue of their motion with respect to the observer.

These and other objects of this invention are accomplished by providing a transparent textile element having a high luster and a thin continuous coating of metal extending over substantially the entire length of the element. The coating extends transversely around not more than about half of the outer surface of the element, such that the element gathers and the coating reflects light received through the uncoated side of the element from external sources.

The drawing shows in cross-section a textile element which embodies the present invention.

Illustrated in the drawing is a textile element 10 having a high luster in the form of a reflecting cylindrical fiber 12 made of a light transmitting material and having approximately half of the outer surface thereof covered with a thin coating 14 of a metal forming a highly reflective surface. The transparent cylindrical fiber is preferably made of a synthetic material, such as plastic, which is capable of being woven or laced into a cloth.

The metal coating 14 preferably comprises metallic particles suspended in a bonding agent or may comprise a thin layer of metal on the order of millionths of an inch thick deposited thereon and coated with a protective layer of plastic. Coating 14 extends over substantially the entire length of the element 10 and also extends transversely around not more than about half of the outer surface of the element 10, as shown by the numerals 16, which mark the edges of the coating. The element 10 has an uncoated side or portion 18, through which the fiber may gather light.

When light is directed towards the fiber 12 from an external source, the light enters the element 10 from the uncoated side or portion 18 and passes through the transparent element 10 until it strikes the coating 14. Upon striking the coating 14, light is reflected off of the coating 14 and passes back through the transparent element 10. Such light then passes out of the element 10 through the uncoated side or portion 18 and appears to an observer to flicker and flash on and off when there is relative motion between the observer and the element 10. Thus, the coated fiber acts as a reflex reflector.

Various modifications are contemplated and may obviously be resorted to by those skilled in the art without departing from the spirit and scope of the invention, as hereinafter defined by the appended claim, as only a preferred embodiment thereof has been disclosed.

What is claimed is:

A transparent textile element that is characterized by a high luster and has a thin continuous coating of metal extending over substantially the entire length of the element and transversely around not more than about half of the outer surface of said element, whereby said element gathers and said coating reflects light received through the uncoated side of said element from external sources.

References Cited by the Examiner
UNITED STATES PATENTS

| | | | |
|---|---|---|---|
| 355,810 | 1/1887 | Brown | 88—79 XR |
| 1,446,241 | 2/1923 | Armstrong | 40—134 |
| 1,521,941 | 1/1925 | Graf | 88—79 |
| 1,698,594 | 1/1929 | Hoff | 94—1.5 |
| 1,729,274 | 9/1929 | Millar | 88—78 XR |
| 1,754,964 | 4/1930 | Pancoast | 88—81 |
| 1,900,945 | 3/1933 | Myers | 40—134 X |
| 2,063,763 | 12/1936 | Shapera | 88—81 |
| 2,366,754 | 1/1945 | Rodli | 88—79 XR |
| 2,407,680 | 9/1946 | Palmquist et al. | 88—82 |
| 2,579,467 | 12/1951 | Brickman. | |

FOREIGN PATENTS

| | | |
|---|---|---|
| 148,607 | 10/1952 | Australia. |
| 873,224 | 4/1953 | Germany. |
| 453,269 | 9/1936 | Great Britain. |
| 305,744 | 2/1933 | Italy. |

JOSEPH B. SPENCER, Primary Examiner.

EVERETT R. REYNOLDS, EDWARD V. BENHAM, JOSEPH E. GONSALVES, WILLIAM MISIEK, E. S. ANDERSON, RICHARD D. NEVIUS, Examiners.